US006925266B1

(12) United States Patent
Muller

(10) Patent No.: US 6,925,266 B1
(45) Date of Patent: Aug. 2, 2005

(54) METHOD FOR DETECTING AND/OR CONTROLLING THE TRANSMISSION WAVELENGTHS OF TRANSMITTING ELEMENTS OF AN OPTICAL WAVELENGTH MULTIPLEX TRANSMISSION UNIT AND A CORRESPONDING WAVELENGTH MULTIPLEX TRANSMISSION UNIT

(75) Inventor: Claus-Georg Muller, Feldafing (DE)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 09/720,599

(22) PCT Filed: Jun. 25, 1999

(86) PCT No.: PCT/DE99/01866

§ 371 (c)(1),
(2), (4) Date: Dec. 22, 2000

(87) PCT Pub. No.: WO00/01106

PCT Pub. Date: Jan. 6, 2000

(30) Foreign Application Priority Data

Jun. 26, 1998 (DE) .......................... 198 28 615

(51) Int. Cl.[7] .............................................. H04B 10/04
(52) U.S. Cl. ...................................... 398/196; 398/34
(58) Field of Search ............................... 398/196, 200, 398/34, 82, 195, 87

(56) References Cited

U.S. PATENT DOCUMENTS

| 5,589,970 | A | | 12/1996 | Lyu et al. | |
|---|---|---|---|---|---|
| 6,301,031 | B2 | * | 10/2001 | Li .................................. | 398/9 |
| 6,304,350 | B1 | * | 10/2001 | Doerr et al. ................... | 398/9 |

FOREIGN PATENT DOCUMENTS

| JP | 08 079128 A | 3/1996 |
|---|---|---|
| JP | 08 293853 A | 11/1996 |

OTHER PUBLICATIONS

J. Lee et al., "Multi–Channel Frequency Stabilization Using Wavelength Crossover Properties of Arrayed Waveguide Grating", Lasers and Electro–Optics 10th Annual Meeting LEOS '97, Nov. 10–13, 1997.*

* cited by examiner

Primary Examiner—Jason Chan
Assistant Examiner—Shi K. Li
(74) Attorney, Agent, or Firm—Workman Nydegger

(57) ABSTRACT

The invention pertains to a method for determining and/or controlling the transmission wavelengths of transmission elements of an optical wavelength division multiplex transmission unit, in which the output signals of several optical transmission elements (7) with respectively one optical transmission spectrum (15) of different center wavelength ($ë_{sj}$) are respectively fed to one optical input ($E_2, E_4, \ldots, E_{n1}$) of an optical wavelength monitoring and coupling unit (3) that combines the output signals into a wavelength division multiplex signal on one or more optical output(s) (A), with the wavelength monitoring and coupling unit (3) being designed such that an optical path, on which a narrow-band high-pass filtering or low-pass filtering takes place, exists between one, more or all inputs ($E_2, E_4, \ldots, E_{n-1}$), to which the output signal of a transmission element (7) is fed, and one or more additional inputs ($E_1, E_3, \ldots, E_n$) that are not connected to transmission elements (7). The filter characteristic on the path is chosen such that the entire spectral power of the signal filtered with the chosen characteristic changes during a shift in the center wavelength of the transmission spectrum (15) of a transmission element (7), the signal of which is fed into this path. The filtered optical signal appearing at one or more additional inputs ($E_1, E_3, \ldots, E_n$) is respectively fed to an optical reception element (9), the output signal of which is evaluated in order to determine the position and/or control the position of the transmission spectrum (15) of one or more of the optical transmission element(s) (7). Instead of providing a combined wavelength monitoring and coupling unit (3), it is also conceivable to utilize a separate wavelength monitoring unit (30) that may be designed analogous with respect to the filtering of the transmission signals. In this case, a fraction of the power of the output signals of the transmission elements is fed to the pertinent inputs. The combining of the individual output signals is realized with the aid of a separate coupling unit. The invention also pertains to a wavelength division multiplex transmission unit for implementing this method.

11 Claims, 4 Drawing Sheets

METHOD FOR DETECTING AND/OR CONTROLLING THE TRANSMISSION WAVELENGTHS OF TRANSMITTING ELEMENTS OF AN OPTICAL WAVELENGTH MULTIPLEX TRANSMISSION UNIT AND A CORRESPONDING WAVELENGTH MULTIPLEX TRANSMISSION UNIT

TECHNICAL FIELD OF THE INVENTION

The invention pertains to a method for determining or controlling the transmission wavelengths of transmission elements of an optical wavelength division multiplex transmission unit as well as a corresponding wavelength division multiplex transmission unit that makes it possible to implement the method according to the invention.

BACKGROUND OF THE INVENTION

In optical transmitters, in particular, laser diodes, the center wavelength of the transmission spectrum is influenced by different parameters, e.g., the temperature of the transmission element which, in turn, depends on the average current intensity and the modulation frequency. A change or shift of the center wavelength is, however, particularly disadvantageous in signal transmission via a single optical waveguide in the wavelength division multiplex mode because this may respectively create or intensify the crosstalk between one channel and one or more adjacent channels.

Consequently, it is usually required to carry out a temperature adjustment of the optical transmission element in order to maintain the transmission power as well as the center wavelength of the transmission element constant within desirable limits. For example, a Peltier cooling element may be used for this purpose, with this cooling element simultaneously preventing the overheating of the transmission element at higher transmission powers. However, since the temperature of the transmission element is only measured at a certain location during temperature control, the process of maintaining constant the center wavelength of the transmission spectrum cannot be ensured with the accuracy required for transmission in the wavelength division multiplex mode. In addition, an option for tuning the transmission wavelengths usually needs to be provided in wavelength division multiplex transmission units so as to allow compensation of manufacturing-related tolerances in the transmission spectrum of the transmission elements. This requires a monitoring of the center wavelength of the transmission elements.

The option of utilizing monitor diodes that are preferably integrated in the transmission element for monitoring the (average) transmission power as known in the state of the art represents a high expenditure for wavelength division multiplex transmission units because each transmission element needs to be equipped with a monitor diode. This complicates the design of the transmission elements.

SUMMARY OF THE INVENTION

The invention aims to develop a method for determining or controlling the transmission wavelengths of transmission elements in an optical wavelength division multiplex transmission unit, in which a determination or control of the center wavelengths of the optical transmission elements can be realized with low expenditure. The invention also aims to develop a corresponding optical wavelength division multiplex transmission unit.

The invention is based on the notion that the center wavelength of an optical transmission element can be maintained constant by branching off a small portion of the output signal and determining the optical power contained in the spectral regions on one or both sides of the desired narrow transmission spectrum. If the transmission spectrum of the optical transmission element is shifted by a small wavelength amount $\ddot{a}\ddot{e}$ in a certain direction, the spectral power increases in the wavelength range that is situated adjacent to the desired narrow transmission spectrum in this direction. The power correspondingly decreases on the other side of the desired transmission spectrum.

According to the invention, the output signals of several optical transmission elements (7) with respectively one optical transmission spectrum (15) of different center wavelength ($\ddot{e}_{sj}$) are respectively fed to an optical input ($E_2$, $E_4$, ..., $E_{n1}$) of an optical wavelength monitoring and coupling unit (3) that combines the output signals on one or more optical outputs (A) into a wavelength division multiplex signal, with the wavelength monitoring and coupling unit (3) being realized in such a way that an optical path, on which a narrow-band high-pass or low-pass filtering takes place, exists between one, more or all inputs ($E_2$, $E_4$, ..., $E_{n-1}$), to which the output signal of a transmission element (7) is fed, and one or more additional inputs ($E_1$, $E_3$, ..., $E_n$) that are not connected to transmission elements (7). In this case, the filter characteristic on the path is chosen such that the entire spectral power of the signal filtered with the chosen characteristic changes during a shift of the center wavelength of the transmission spectrum (15) of a transmission element (7), the signal of which is fed into this path. The filtered optical signal appearing at one or more additional inputs ($E_1$, $E_3$, ..., $E_n$) is respectively fed to an optical reception element (9), the output signal of which is evaluated in order to determine the position and/or control the position of the transmission spectrum (15) of one or more optical transmission elements (7). Instead of utilizing a combined wavelength monitoring and coupling unit (3), it would also be conceivable to use a separate wavelength monitoring unit (30) that may be designed analogously with respect to the filtering of the transmission signals. In this case, a fraction of the power of the output signals of the transmission elements is fed to the pertinent inputs. The combining of the output signals is realized by means of a separate coupling unit.

This method can, in particular, be realized by utilizing generally known passive optical wavelength division multiplexers. In the preferred embodiment of a wavelength division multiplex transmission unit for implementing the method according to the invention, the optical wavelength monitoring and coupling unit or the wavelength monitoring unit as such, respectively, is realized in the form of a generally known phased array.

Such a phased array with a desirable number of inputs and one or more outputs has the property that a transmission spectrum applied to an arbitrary input, e.g., the transmission spectrum of a laser diode, is filtered in a narrow-band fashion and fed to the common output or the several outputs, respectively. If several outputs are provided, the multiplexed signal is present at each output such that several transmission paths can be excluded in this fashion. If the filter spectrums between each input and one output are illustrated in only one diagram, a corresponding number of narrow-band band pass characteristics which are situated directly adjacent to one another result. In addition, such a phased array has the property that the spectral portions of a transmission spectrum applied to an arbitrary input which lie outside the filter characteristic between the pertinent input and the output appear in the form of an output signal at those inputs, into the filter characteristic of which (between the pertinent input and the output) these spectral portions fall.

For example, if the transmission spectrum of a very narrow-band laser diode (for example, a DFB laser) lies within the filter characteristic between the pertinent input and the common output during an optimal operation of the laser diode, no output signal can be detected at the inputs that lie adjacent to the pertinent input with respect to the center wavelength. However, if the center wavelength of the laser diode is shifted in a certain direction, for example, due to a temperature increase of the chip, the lateral spectral portions of the transmission spectrum are initially shifted outside of the band pass characteristic of the pertinent input and consequently into the range of the band pass characteristic of the pertinent adjacent input. The detectable optical power at the pertinent adjacent input increases proportionally to the shift of the transmission spectrum in this direction.

Naturally, it is not necessary that the transmission spectrum be, in case of the optimal position of the center wavelength, situated within the filter characteristic of the pertinent input in its entirety. In order to achieve the most exact determination or control of the center wavelength possible, it may even be desirable that the spectral portions of the transmission spectrum extend into the range of the respectively adjacent band pass characteristics if the position of the center wavelength is optimal. Due to this measure, slight shifts of the center wavelength can be detected due to the increase or decrease of the output power occurring at the adjacent inputs. This means that the signal of an optical reception element provided on the correspondingly adjacent input can be used for determining whether the center wavelength of the observed optical transmission element is maintained within predetermined limits or for influencing an operational parameter of the optical transmission element in such a way that the pertinent center wavelength is maintained constant within predetermined limits, namely in the sense of a closed loop. For example, the temperature of the pertinent optical transmission element can be changed by controlling a cooling element in the desired fashion.

According to one embodiment of the invention, a corresponding wavelength division multiplex transmission unit can be designed in such a way that every second input of the wavelength division multiplex unit is connected to an optical reception element and the inputs situated in between are connected to an optical transmission element. In this embodiment, it can be ensured with a high accuracy that even slight shifts of the center wavelength of all optical transmission elements can be detected and, if so required, compensated. In this case, the control of the transmission elements may either take place collectively, for example, after the correcting variable was determined as the result of a compensation calculation in dependence on the detected deviation of the center wavelengths of all transmission elements, or separately for each transmission element. Naturally, it would also be possible to only monitor one or several selected transmission elements by providing optical reception elements on both sides of the respectively adjacent inputs. This would, for example, be advantageous in instances, in which it can be assumed that the individual transmission elements behave analogously. Consequently, if a shift of the transmission spectrum of one or more transmission elements is detected, it can be concluded that the transmission spectrums of all transmission elements have shifted analogously.

BRIEF DESCRIPTION OF THE DRAWINGS

The invention is described in greater detail below with reference to one embodiment that is illustrated in the figures. The figures show.

DESCRIPTION OF THE PREFERRED EMBODIMENTS

Figure 1:
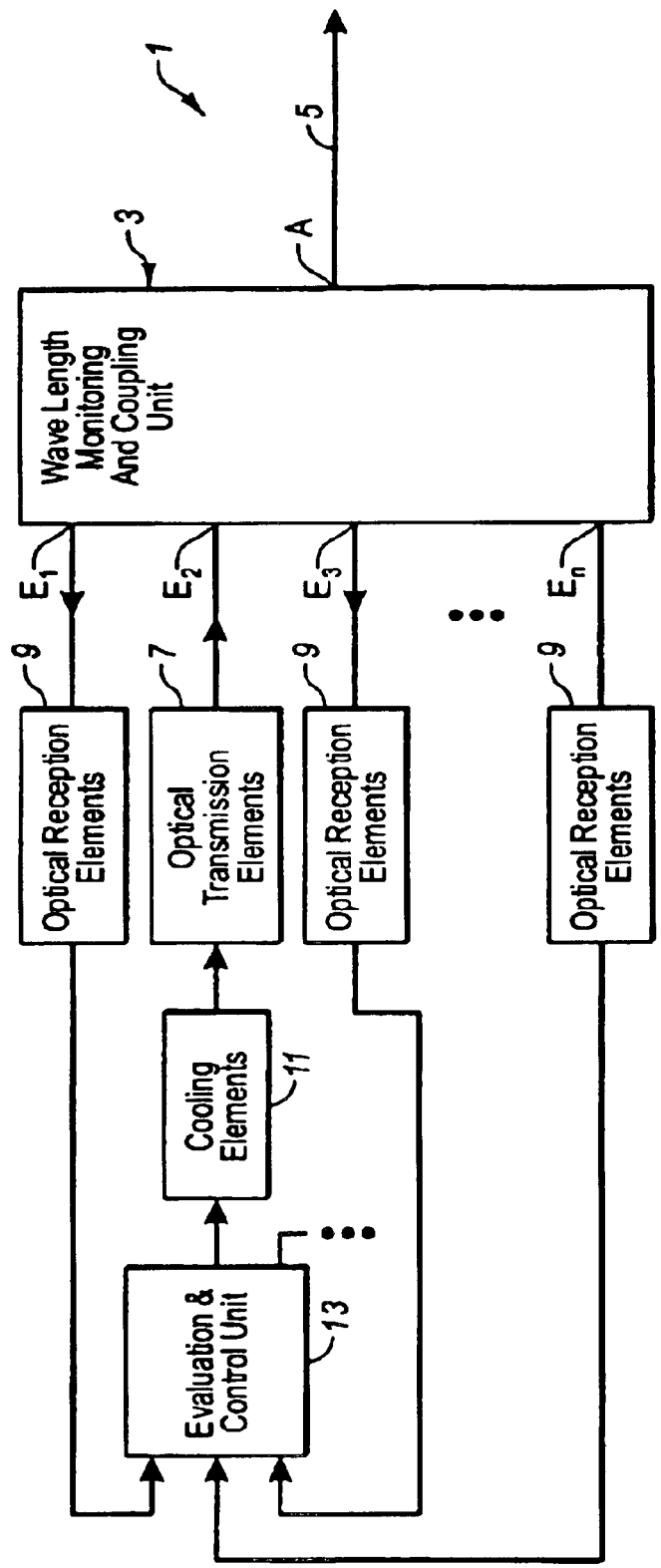
FIG. 1, a schematic block diagram of an optical wavelength division multiplex transmission unit according to the invention.

The wavelength division multiplex transmission unit 1 which is shown in FIG. 1 contains a wavelength monitoring and coupling unit 3 with n inputs $E_1$, $E_2$, $E_3$ through $E_n$ and one output A. The output A may be connected to an optical waveguide 5 of a wavelength division multiplex transmission path. In the embodiment shown in FIG. 1, the inputs $E_2$, $E_4$ through $E_{n-1}$ are connected to optical transmission elements 7 that, for example, may consist of laser diodes. The remaining inputs $E_1$, $E_3$ through $E_n$ are each connected to one optical reception element 9. The optical transmission elements 7 are respectively cooled by means of a cooling element 11 in the embodiment shown. These cooling elements may, for example, consist of Peltier elements. The output signals of the optical reception elements 9 are fed to an evaluation and control unit 13 that evaluates the signals of the optical reception elements 9. Depending on the result of the evaluation, the evaluation and control unit 13 is able to control the cooling elements 11 in such a way that the center frequency of the transmission spectrums of the optical transmission elements 7 is maintained constant within predetermined limits.

Figure 2:
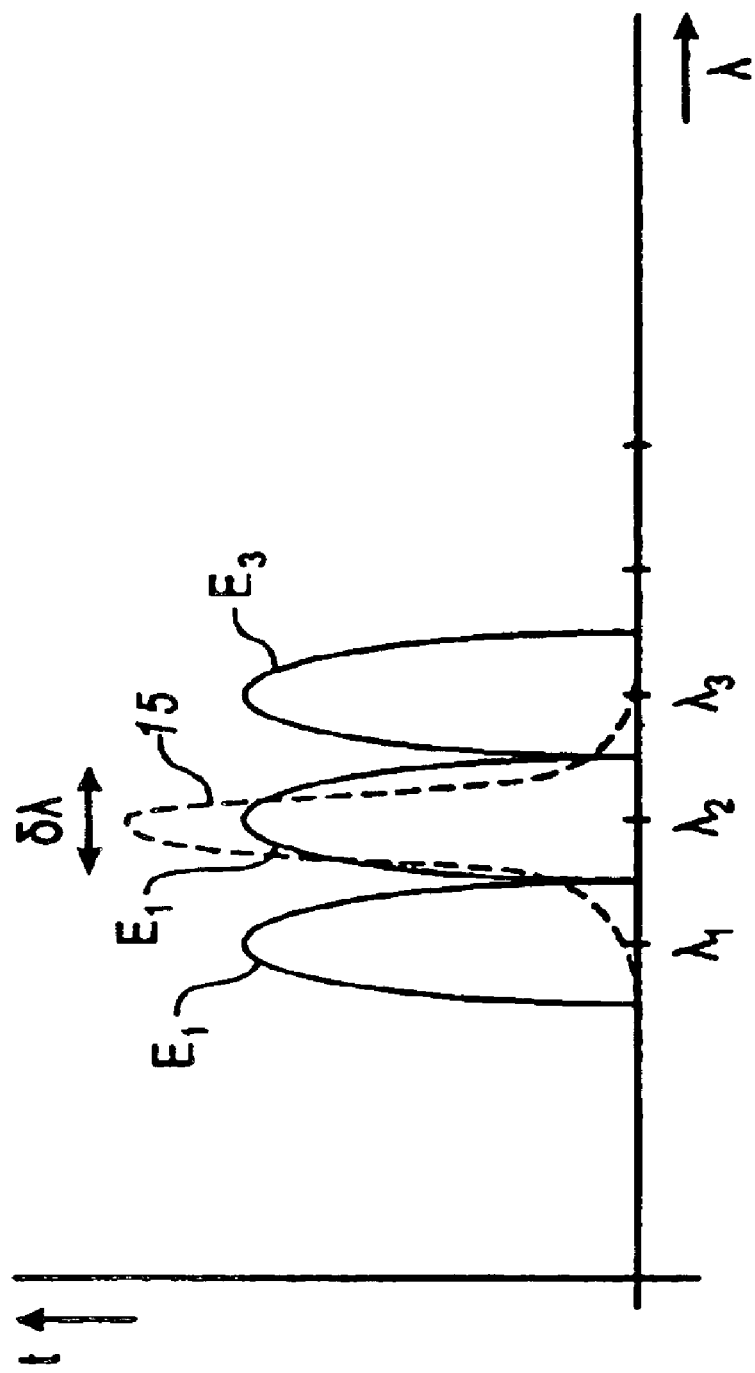
FIG. 2, a diagram with the spectral transmission characteristics t(ë) of the wavelength division multiplex unit of the wavelength division multiplex transmission unit shown in FIG. 1.

The optical wavelength monitoring and coupling unit 3 has the following properties: an optical path, on which a narrow-band filtering with a center frequency ë1, ë2, ë3 through en takes place, is provided between each of the inputs $E_1$ through $E_n$ and the common output A. The band pass characteristics of the inputs $E_1$, $E_2$ and $E_3$ are shown in FIG. 2, with the reference symbol t identifying the transmission on the pertinent optical path. FIG. 2 also shows the transmission spectrum 15 of the optical transmission element 7 that is connected to the input $E_2$ in the form of broken lines. The majority of the transmission spectrum 15 is situated within the characteristic of the optical path between the input $E_2$ and the output A. The lateral edge regions of the transmission spectrum 15 of the optical transmission element 7 extend into the band pass characteristics between the input $E_1$ and the output A and between the input $E_3$ and the output A, respectively.

FIG. 2 indicates that the band pass characteristics of the adjacent inputs of the wavelength monitoring and coupling unit 3 preferably lie directly adjacent to one another. However, this is not absolutely imperative. Due to this measure, an optimal utilization of the transmission capacity of the transmission path is achieved in the wavelength division multiplex mode.

The wavelength monitoring and coupling unit 3 also has the property that the spectral portions of a transmission spectrum applied to an arbitrary input $E_i$ which lie outside of the band pass characteristic between this input $E_i$ and the output A appear in the form of an output signal at the inputs $E_j$, into the band pass characteristics of which (between the respective input $E_j$ and the output A) the pertinent spectral portions fall.

According to the embodiment shown in FIG. 2, those spectral portions of the transmission spectrum 15 appear at the inputs $E_1$ and $E_3$ in the form of output signals which fall into the band pass characteristics of these two inputs if the transmission spectrum 15 is applied to the input $E_2$.

This makes it possible to determine a shift of the transmission spectrum 15 by a slight amount $\ddot{a}\ddot{e}$ by evaluating the signals of the optical reception elements 9 which are connected to the inputs $E_1$ and $E_3$.

A shift of the transmission spectrum 15 in the direction of smaller wavelengths is detected by the evaluation and control unit 13 if the output signal of the reception element 9 that is connected to the input $E_1$ reflects a higher power and the output signal of the reception element that is connected to the input $E_3$ reflects a lower power in comparison to the original state.

Due to the arrangement of reception elements at the inputs to both sides of the input with the optical transmission element, it is possible to differentiate whether the transmission element situated between the two reception elements fluctuates with respect to its wavelengths or a transmission element 7 that is respectively situated on the other side of the reception element 9.

The monitoring coupling unit 3 can be simply realized with the aid of a phased array that contains a corresponding number of inputs and one output. This results in an exceptionally low constructive and financial expenditure. Naturally, the monitoring coupling unit 3 may also be realized differently, for example, by utilizing a Bragg grid or several Fabry-Perot filters.

Figure 3:
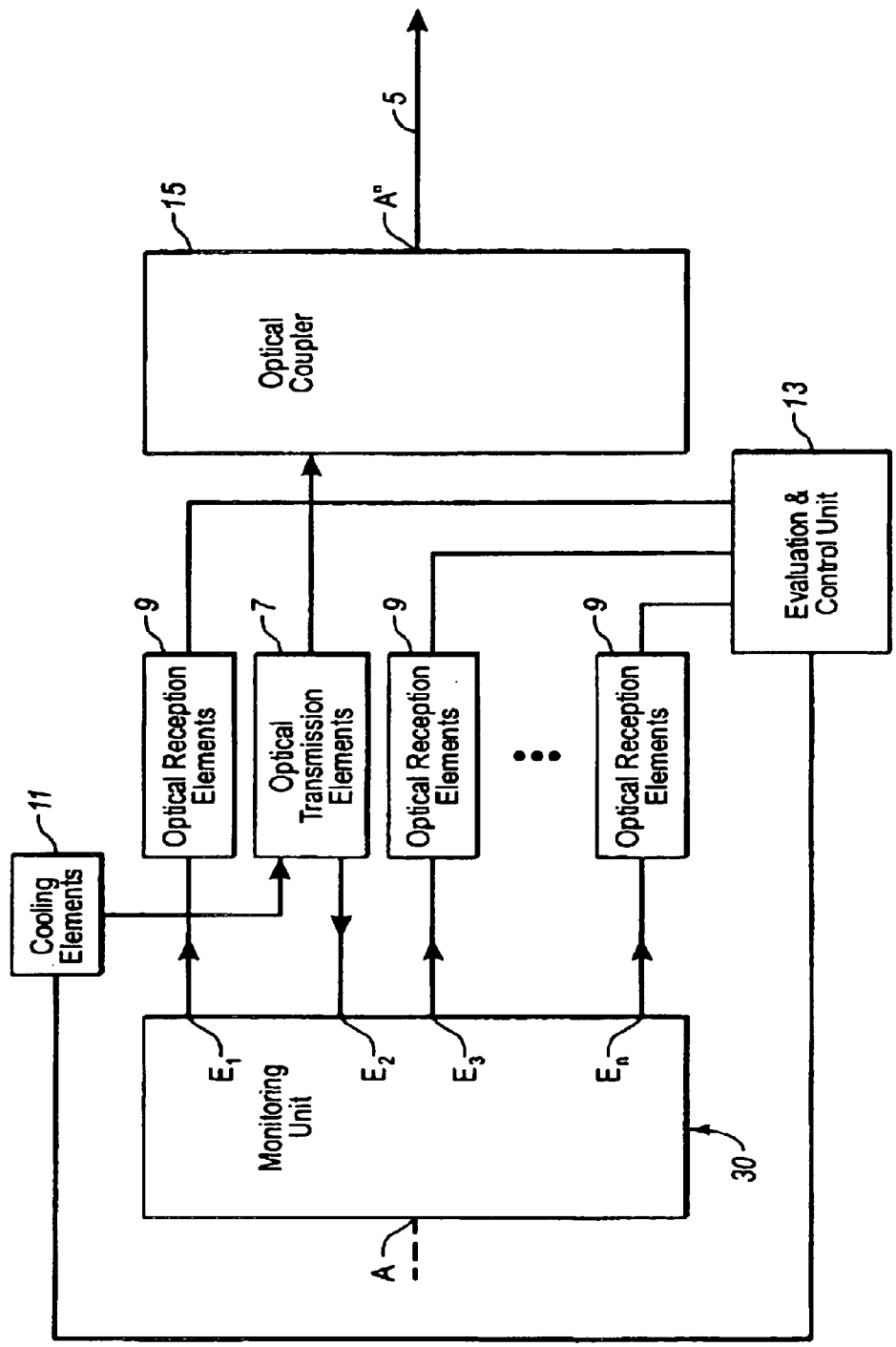
FIG. 3, a schematic block diagram of a second embodiment of an optical wavelength division multiplex transmission unit according to the invention, and FIG. 4, a schematic block diagram of a third embodiment of an optical wavelength division multiplex transmission unit according to the invention.

The second embodiment which is shown in FIG. 3 contains a separate wavelength monitoring unit 30 instead of a combined wavelength monitoring and coupling unit 3. This separate wavelength monitoring unit may, in principle, be designed exactly identical and exhibit the same properties as described previously with reference to the wavelength monitoring and coupling unit 3 in FIG. 1. However, the wavelength monitoring unit 30 does not have to fulfill the additional function of combining the output signals of the transmission elements 7.

In the embodiment shown in FIG. 3, the outputs of transmission elements 7 which deliver the transmission power are not connected to the inputs $E_2$, $E_4$, ... $E_{n-1}$. In this case, a fraction of the power is separately decoupled by each transmission element 7 and fed to the monitoring unit 30 in the previously described fashion.

At the remaining inputs $E_1$, $E_3$, ... $E_n$ of the monitoring unit 30, the respectively appearing optical power is fed to the optical reception elements coupled thereto. The monitoring and control of the reception elements 9 takes place as described above.

The combining of the transmission signals of the transmission elements 9 on a common output A may, for example, be realized with a simple passive broad-band m×1 coupler 15 in this embodiment, with m representing the number of transmission elements. Naturally, the transmission signals may also be combined on several common outputs. If the monitoring unit 30 is designed analogous to the wavelength monitoring and coupling unit 3, for example, in the form of a conventional phased array, the output A of the monitoring unit 30 may remain unused. However, it may also be used for carrying out an additional analysis of the multiplex transmission signal.

Figure 4:
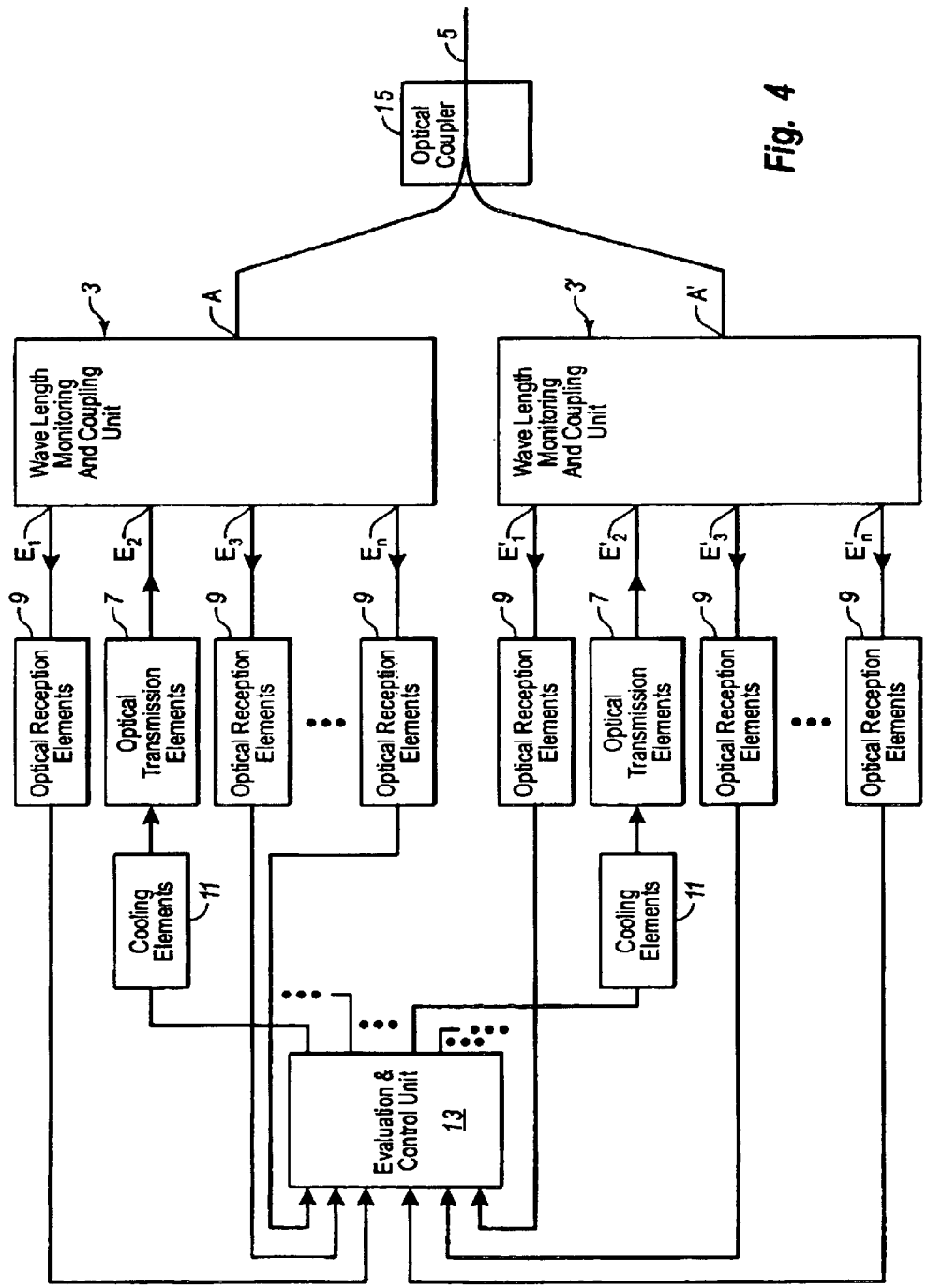

FIG. 4 shows a wavelength division multiplex transmission unit in which two transmission units according to FIG. 1 are, in principle, arranged in a cascade fashion. Instead of utilizing two evaluation and control units 13, only one evaluation and control unit 13' is provided in order to reduce the expenditure. The outputs A, A' of the wavelength monitoring and coupling units 3, 3' are combined by an optical coupler 15, and the combined optical output signal is fed to the transmission path 5.

The wavelength monitoring and coupling units 3, 3' are designed in such a way that the center wavelength of each input $E_j'$ of the unit 3' corresponds to the center wavelength of the input $E_{j-1}$ of the unit 3, and that the preferably constant spacing between the individual channels (respectively from input to output with a certain spectral width $\ddot{A}\ddot{e}$) is identical with respect to the center wavelength $\ddot{e}_j$ in both wavelength monitoring and coupling units 3, 3'. This provides the advantage that an optimal utilization of the band width can be ensured. In extreme instances, the channels of the spectral width $\ddot{A}\ddot{e}$ may be situated directly adjacent to one another, i.e., the spacing between adjacent channels is chosen identical to the spectral width of a channel. Despite this completely or at least optimally utilized band width, the inputs which are respectively situated adjacent to an input with a transmission element 7 coupled thereto can be used for the wavelength monitoring of this transmission element in each wavelength monitoring and coupling unit 3, 3' in the embodiment shown.

This cascading may naturally also be applied analogously to the embodiment according to FIG. 3, with only one (correspondingly broad-band) optical coupler 15 being required which needs to contain a corresponding number of inputs. In other respects, the previous explanations apply to FIG. 4.

In conclusion, it should be mentioned that the wavelength monitoring unit as well as the combined wavelength monitoring and coupling unit may naturally also be realized differently as long as the basic principle is realized. This basic principle consists of subjecting at least the signal of one transmission element to at least one high-pass, low-pass or band pass characteristic which is chosen such that a change in the power of the filtered (partial) signal takes place if the transmission spectrum is shifted by a small amount.

In integrated wavelength division multiplex transmission units or wavelength division multiplex transmission units that are realized on a very constricted space, it may suffice to respectively determine and control the shift of the transmission spectrum of one transmission element. This is possible because the individual transmission elements frequently behave similarly with respect to temperature changes or aging. Consequently, the information obtained by the analysis of one signal can also be used for regulating/controlling the other transmission elements.

What is claimed is:

1. An optical wavelength division multiplex transmission unit comprising:
   (a) several optical transmission elements with respectively one optical transmission spectrum of different center wavelength, the output signal of which is respectively fed to one optical input port of an optical wavelength monitoring and coupling unit that combines the output signals into a wavelength division multiplex signal on one or more optical outputs;

(b) wherein the wavelength monitoring and coupling unit is designed such that:

an optical path, on which a narrow-band high-pass filtering or low-pass filtering takes place, exists between one, more or all input ports, to which the output signal of a transmission element is fed, and one or more output ports that are not connected to transmission elements; and with respect to the center wavelengths of the filter characteristics, each of the output ports is connected to an optical reception element, wherein every second port of the wavelength division multiplex transmission unit is an output port;

(c) wherein the filter characteristic on the path are chosen such that the entire spectral power of the signal filtered with the chosen characteristic changes during a shift in the center wavelength of the transmission spectrum of a transmission element, the signal of which is fed into this path;

(d) one or more optical reception elements that are respectively connected to one of the output ports and detect the filtered optical signal appearing at the output ports; and (e) an evaluation and control unit, to which the output signal of the at least one reception element is fed, with said evaluation and control unit evaluating the signal of the reception element in order to determine the position and/or control the position of the transmission spectrum of one or more of the optical transmission elements.

2. The optical wavelength division multiplex transmission unit according to claim 1, wherein the wavelength monitoring and coupling unit is designed in such a way that a narrow-band filter characteristic with a center wavelength that is different for each output port is assigned to each output port, wherein optical paths exist between all input ports and all output ports, with the optical signal conveyed on these paths being filtered with at least that filter characteristic which is assigned to the output port that lies at the output end of the optical path.

3. The optical wavelength division multiplex transmission unit according to claim 2, wherein the wavelength monitoring and coupling unit is realized in the form of a phased array or by utilizing a Bragg grid.

4. The optical wavelength division multiplex transmission unit according to claim 1, wherein the evaluation and control unit determines and/or controls with respect to the center wavelength each spectrum of the transmission elements by evaluating the output signals of at least both reception elements which are connected to the adjacent output ports.

5. The optical wavelength division multiplex transmission unit according to claim 1, wherein two wavelength monitoring and coupling units are provided, with the filter characteristics assigned to the input ports essentially being offset relative to one another by half the wavelength difference between adjacent input ports with respect to the center wavelength, and wherein the output signals of the two wavelength monitoring and coupling units are combined into a complete wavelength division multiplex signal by means of a coupling unit.

6. An optical wavelength division multiplex transmission unit comprising:

(a) several optical transmission elements with respectively one optical transmission spectrum of different center wavelength, the output signal of which is respectively fed to an optical input port of an optical coupling unit that combines the output signals on one or more optical outputs to a wavelength division multiplex signal;

(b) wherein a small fraction of the transmission power of the output signal of one or more transmission elements is respectively fed to an optical input port of an optical wavelength monitoring unit;

(c) wherein the wavelength monitoring unit is designed such that:

an optical path, on which a narrow-band high-pass or low-pass filtering takes place, exists between one, more or all input ports to which the fraction of the transmission power of the output signal of a transmission element is fed, and one or more output ports that are not connected to transmission elements; and with respect to the center wavelengths of the filter characteristics, each of the output ports is connected to an optical reception element, wherein every second port of the wavelength division multiplex transmission unit is an output port;

(d) wherein the filter characteristic on the path is chosen such that the entire spectral power of the signal filtered with the chosen characteristic changes during a shift in the center wavelength of the transmission spectrum of a transmission element, the signal of which is fed into this path;

(e) one or more optical reception elements that are respectively connected to one of the output ports and detect the filtered optical signal appearing at the output port; and (f) an evaluation and control unit, to which the output signal of the at least one reception element is fed, with said evaluation and control unit evaluating the signal of the reception element in order to determine the position and/or control the position of the transmission spectrum of one or more of the optical transmission elements.

7. The optical wavelength division multiplex transmission unit according to claim 6, wherein the wavelength monitoring unit is designed in such a way that a narrow-band filter characteristic with a center wavelength that is different for each output port is assigned to each output port, and wherein optical paths exist between all input ports and all output ports with the optical signal conveyed on these paths being filtered with at least that filter characteristic which is assigned to the output port that lies at the output end of the optical path.

8. The optical wavelength division multiplex transmission unit according to claim 7, wherein the wavelength monitoring unit is realized in the form of a phased array or by utilizing a Bragg grid.

9. The optical wavelength division multiplex transmission unit according to claim 6, wherein the evaluation and control unit determines and/or controls with respect to the center wavelength each spectrum of the transmission elements by evaluating the output signals of at least both reception elements which are connected to the adjacent output ports.

10. The optical wavelength division multiplex transmission unit according to claim 6, wherein two wavelength monitoring units are provided, with the filter characteristics assigned to the input ports essentially being offset relative to one another by half the wavelength difference between adjacent input ports with respect to the center wavelength, and wherein the output signals of the two wavelength monitoring units are combined into a complete wavelength division multiplex signal by means of a common coupling unit.

11. An optical wavelength division multiplex transmission system comprising:

two optical wavelength division multiplex transmission units, each including:
(a) several optical transmission elements with respectively one optical transmission spectrum of different center wavelength, the output signal of which is respectively fed to an optical input port of an optical coupling unit that combines the output signals on one or more optical outputs to a wavelength division multiplex signal;
(b) wherein a small fraction of the transmission power of the output signal of one or more transmission elements is respectively fed to an optical input port of an optical wavelength monitoring unit;
(c) wherein the wavelength monitoring unit is designed such that an optical path, on which a narrow-band high-pass or low-pass filtering takes place, exists between one, more or all input ports to which the fraction of the transmission power of the output signal of a transmission element is fed, and one or more output ports that are not connected to transmission elements; and
(d) wherein the filter characteristic on the path is chosen such that the entire spectral power of the signal filtered with the chosen characteristic changes during a shift in the center wavelength of the transmission spectrum of a transmission element, the signal of which is fed into this path;
(e) one or more optical reception elements that are respectively connected to one of the output ports and detect the filtered optical signal appearing at the output port; and
(f) an evaluation and control unit, to which the output signal of the at least one reception element is fed, with said evaluation and control unit evaluating the signal of the reception element in order to determine the position and/or control the position of the transmission spectrum of one or more of the optical transmission elements; and a coupling unit that combines the output signals of the two wavelength monitoring units into a complete wavelength division multiplex signal, wherein the filter characteristics assigned to the input ports of the two optical wavelength division multiplex transmission units are essentially offset relative to one another by half the wavelength difference between adjacent input ports with respect to the center wavelength.

* * * * *

UNITED STATES PATENT AND TRADEMARK OFFICE
CERTIFICATE OF CORRECTION

| | | |
|---|---|---|
| PATENT NO. | : 6,925,266 B1 | Page 1 of 1 |
| APPLICATION NO. | : 09/720599 | |
| DATED | : August 2, 2005 | |
| INVENTOR(S) | : Claus-Georg Muller | |

It is certified that error appears in the above-identified patent and that said Letters Patent is hereby corrected as shown below:

Cover Page
Item [57], ABSTRACT, lines 6, 21 and 27, change "(15)" to --(20)--

Figure 2
Replace Figure 2 with the figure depicted herein below, where reference numeral "15" has been changed to --20--

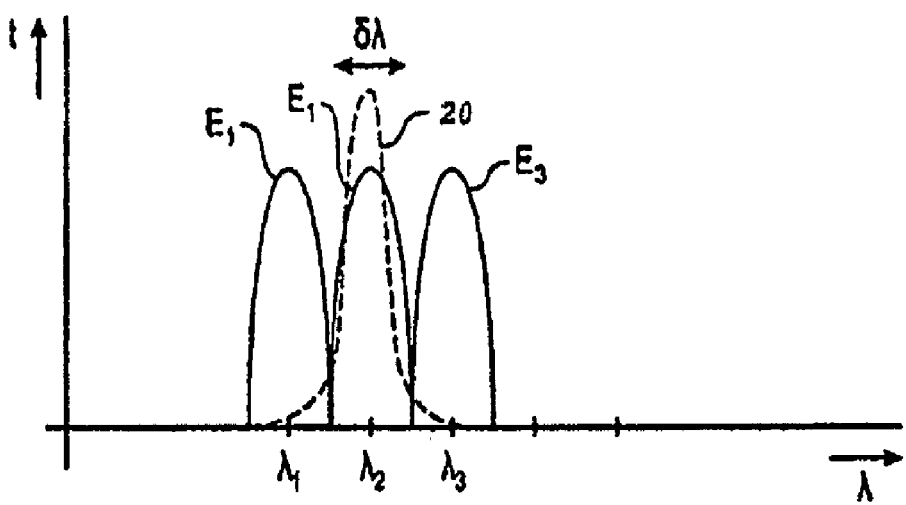

Fig. 2

Signed and Sealed this

Thirty-first Day of July, 2007

JON W. DUDAS
*Director of the United States Patent and Trademark Office*

UNITED STATES PATENT AND TRADEMARK OFFICE
CERTIFICATE OF CORRECTION

PATENT NO. : 6,925,266 B1
APPLICATION NO. : 09/720599
DATED : August 2, 2005
INVENTOR(S) : Claus-Georg Muller It is certified that error appears in the above-identified patent and that said Letters Patent is hereby corrected as shown below:

Cover Page
Item [57], ABSTRACT, lines 6, 21 and 27, change "(15)" to --(20)--

Figure 2
Replace Figure 2 with the figure depicted herein below, where reference numeral "15" has been changed to --20--

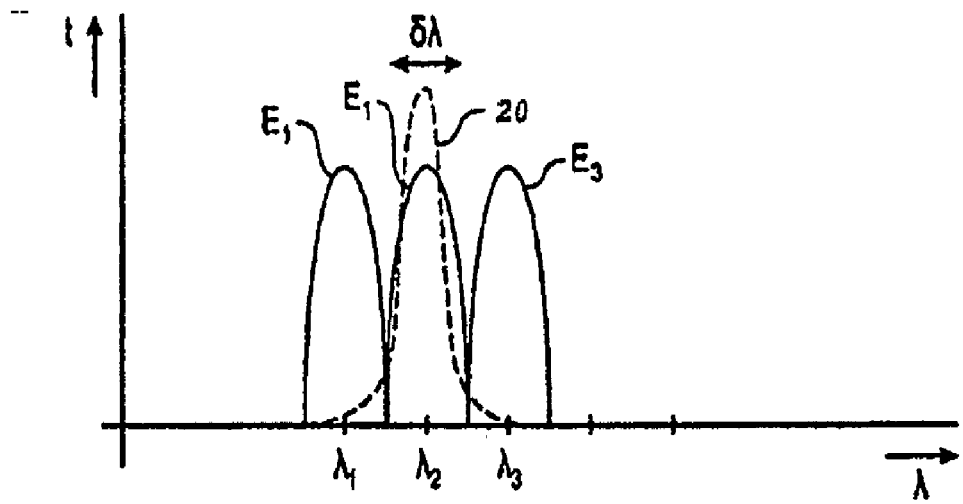

Fig. 2

UNITED STATES PATENT AND TRADEMARK OFFICE
CERTIFICATE OF CORRECTION

PATENT NO.         : 6,925,266 B1
APPLICATION NO. : 09/720599
DATED              : August 2, 2005
INVENTOR(S)        : Claus-Georg Muller It is certified that error appears in the above-identified patent and that said Letters Patent is hereby corrected as shown below:

Column 2
Lines 15, 30 and 36, change "(15)" to --(20)--

Column 4
Line 47, change "en" to --ën--
Lines 52, 54 and 57, change "15" to --20--

Column 5
Lines 10, 13, 15 and 20, change "15" to --20--

Column 7
Line 16, after "path" change "are" to --is--

This certificate supersedes the Certificate of Correction issued July 31, 2007.

Signed and Sealed this

Twenty-ninth Day of July, 2008

JON W. DUDAS
*Director of the United States Patent and Trademark Office*